March 6, 1945.  W. E. GREMPLER  2,370,656
APPARATUS FOR UTILIZING WASTE HEAT
Filed Oct. 14, 1943   3 Sheets-Sheet 1

Inventor
William E. Grempler
By
Attorneys

March 6, 1945. W. E. GREMPLER 2,370,656
APPARATUS FOR UTILIZING WASTE HEAT
Filed Oct. 14, 1943 3 Sheets-Sheet 2

Inventor
William E Grempler
By [signatures]
Attorneys

Patented Mar. 6, 1945

2,370,656

UNITED STATES PATENT OFFICE 2,370,656

APPARATUS FOR UTILIZING WASTE HEAT

William E. Grempler, Baltimore, Md.

Application October 14, 1943, Serial No. 506,282

6 Claims. (Cl. 122—7)

(Granted under the act of March 3, 1883, as amended April 30, 1928; 370 O. G. 757)

The invention described herein may be manufactured and used by or for the Government for governmental purposes, without payment to me of any royalty thereon.

This invention relates generally to industrial furnaces but more particularly to a glass furnace construction and operation by which the usually wasted heat of the exhaust gases may be utilized to operate necessary auxiliary apparatus.

One object of the invention is to provide a glass furnace in which substantially all of the heat not actually utilized in heating the glass is converted into steam energy or used to preheat the air for the burner blast.

Another object of the invention is to provide a glass furnace having a steam boiler in connection therewith so constructed that the glass furnace may be shut down for cleaning purposes without interfering with the operation of the boiler.

Referring to the figures in which like parts are represented by similar reference characters—

Fig. 4 is a sectionalized view taken on the line 4—4 of Fig. 2, showing a longitudinal section of the boiler and an elevation of a side wall with closing slabs;

Fig. 5 is a detail plan view showing the means for operating the draft slabs on the fire box of the boiler.

Briefly stated, the instant invention consists in uniting a steam boiler to a glass furnace and a recuperator, and using the exhaust gases of the glass furnace for the generation of power by means of the boiler.

The furnace, the recuperator and the boiler are connected by passages for the conduction of the hot gases in a manner that is most efficient in the operation of both the furnace and the boiler.

Heretofore, in the construction of glass furnaces the heated gases after passing through the melting chamber were either discharged into the atmosphere through a stack or used to heat a recuperator through which incoming air was passed before combining with gas entering the furnace. In the apparatus set forth herein gases from the melting chamber of the furnace are divided, and one portion thereof is passed first through a recuperator and then through the tubes of a boiler, and the remaining portion directly through a fire box beneath the boiler.

Figure 1:
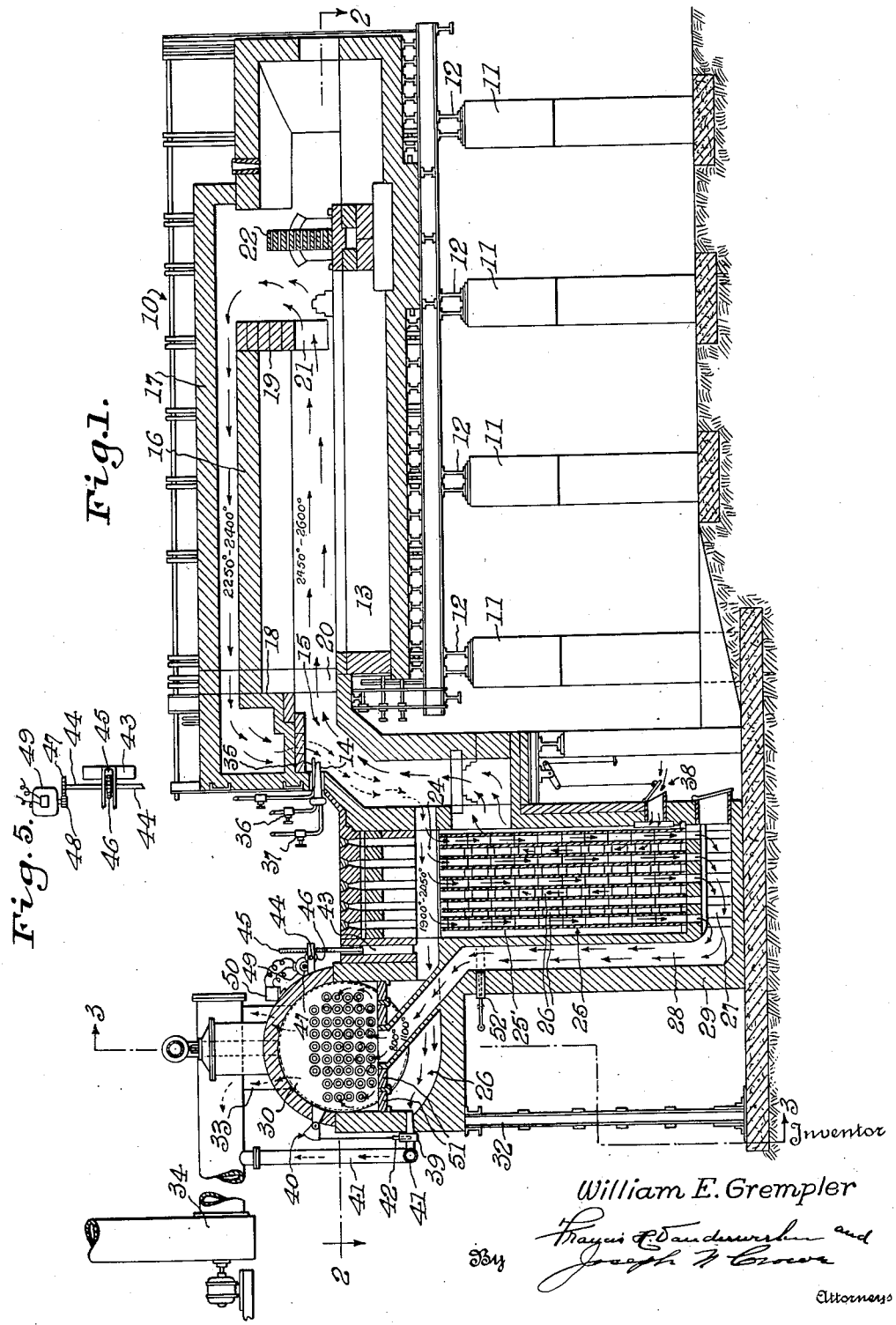
Fig. 1 is a sectionalized elevation taken on the line 1—1 of Fig. 2 showing the alignment of the furnace, the recuperator and the boiler, and the connecting gas passages.
Figure 2:
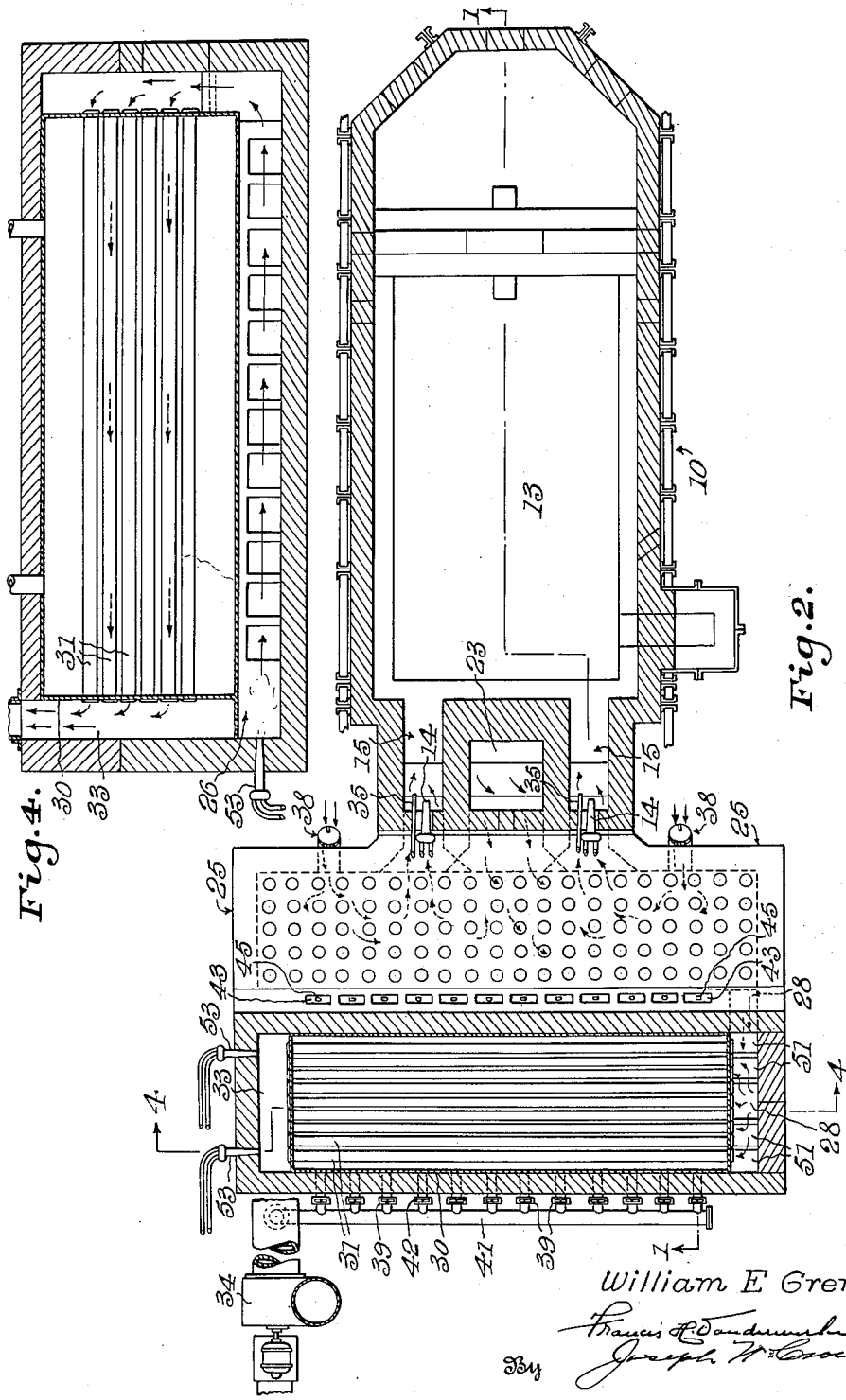
Fig. 2 is a sectionalized plan view, taken on the line 2—2 of Fig. 1, showing the tubular construction of the boiler and the recuperator.
Figure 3:
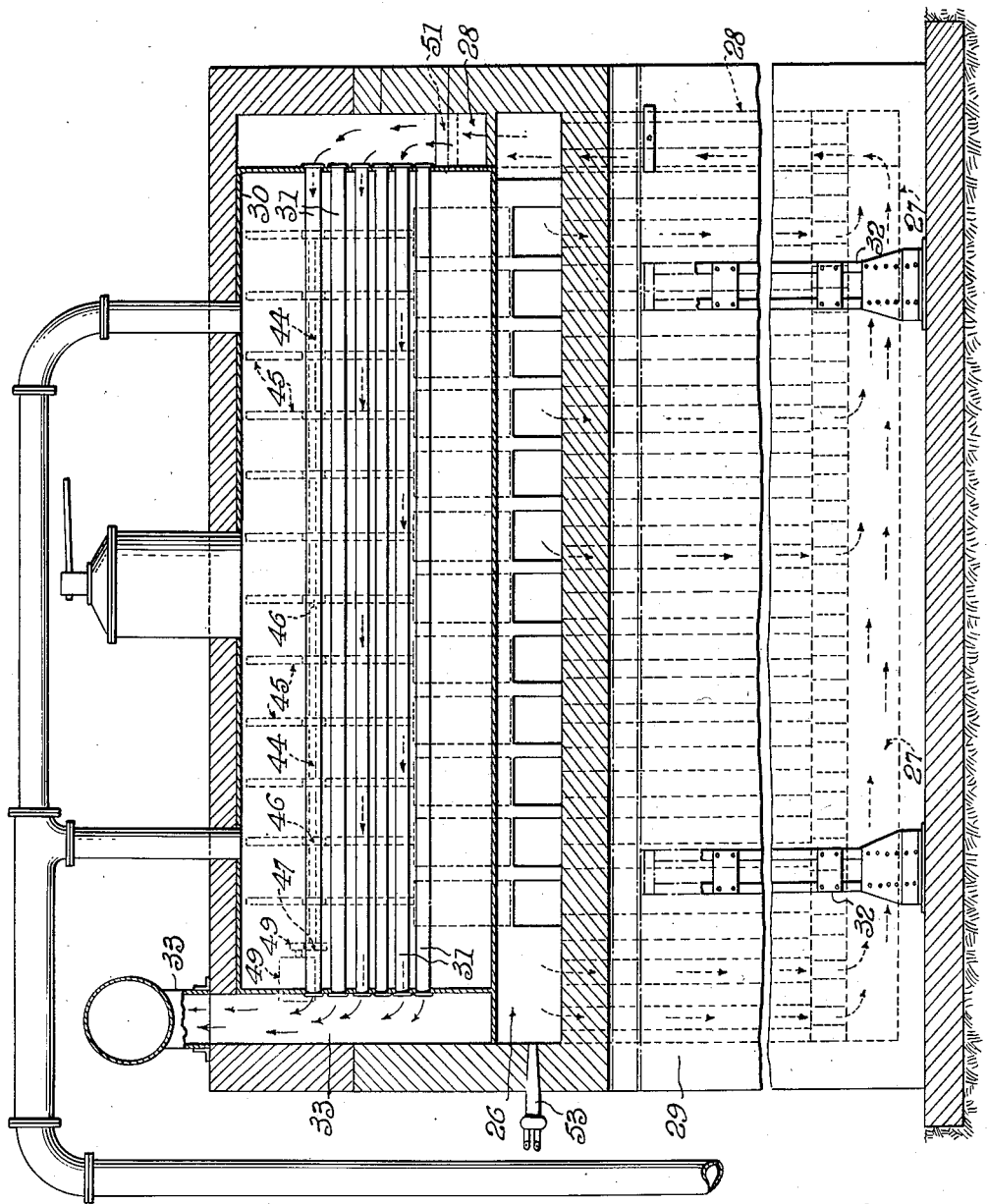
Fig. 3 is a partially sectionalized view taken on the line 3—3 of Fig. 1, showing a longitudinal section of the boiler and a partial side elevation of the exterior of the recuperator.

Referring to Fig. 1, which shows the alignment of the units referred to above, the numeral 10 designates the glass furnace which is supported by columns 11 and cross-beams 12. At the bottom of the glass furnace is located the melting chamber 13 above which pass the hot gases from nozzles 14 located at the front end of the combustion chamber 15. Above the melting chamber 13 is located a cap or ceiling 16 which lies between the roof or top 17 of the furnace and the melting chamber 13. This cap is supported at the front and rear by the walls 18 and 19 through which there are openings 20 and 21 for the passage of the hot gases. The hot gases pass out the opening 21 and are then directed upwardly by the baffle wall 22 and pass over the cap 16, and through the passage 23 (see Fig. 2) to the upper portion of the recuperator 25 where the gases enter the chamber or passage 24 at the upper ends of the recuperator tubes 25' the said passage 24 forming a continuation of the boiler fire box 26.

The recuperator comprises a housing containing a plurality of parallel heating tubes 25' and passages 26 formed by spaces between the tubes, so that gases passing through these tubes 25' heat the incoming air passing around the tubes in the spaces 26, as will be further explained in the description of the operation of the furnace and the operation of the boiler by exhaust gases. The lower ends of the recuperator tubes 25' terminate in a passage 27 at the bottom of the recuperator which is connected to a stack or passage 28 adjacent the wall 29 of the recuperator housing which wall also functions as a boiler support. The stack 28 leads to the front end of the boiler 30 so that gases passing through the stack 28 enter the boiler tubes 31.

The boiler 30 is mounted upon columns or standards 32 and is also supported by the recuperator wall 29. The boiler is also supplied with a stack 33 to which is connected an exhaust fan 34 to effect a draft through its tubes 31.

Further details of the apparatus are set forth in the description of its operation which follows:

Before starting the furnace 10, all unnecessary openings or ports are sealed with fire clay and gas pilots 35 are left burning for one or two days so that all dampness can be eliminated and the stones or blocks are ready for receiving heat. After the operator feels assured that the temperature is sufficiently high, the draft or exhaust fan 34 is started and the valves 36 and 37 of the oil and air lines which are located next to the pilots 35 are opened. Thus a circulation is created which is continued until the temperature has increased sufficiently to ignite the oil without the aid of a pilot by the intense heat which has been created.

The hot gases which have been discharged through the tile tubes 25' of the recuperator 25 preheat the fresh air which rises in the spaces 26 around the outside of these tubes 25'. Gas may be substituted for oil in operating the furnace in districts where natural gas may be obtained, as many glass furnaces are now operated by gas alone.

When the furnace is in operation, the circulation of air and gases can be traced from its entrance at the bottom of the recuperator on the side next to the furnace, where air enters a draft damper or dampers as indicated by the numeral 38.

The fresh air enters and starts its upward travel through the recuperator 25 on the outside or around the tile or tubes 25' which are built inside of the recuperator. At this point the fresh air is being preheated, and becomes warm on reaching approximately half the height of the recuperator 25. During its upward course through the recuperator the fresh air becomes sufficiently hot to cause combustion after it leaves the recuperator and travels up to the entrance of the furnace, as indicated by the numeral 15, where it comes into contact with and ignites the mixture of air and atomized oil from nozzles 14.

After ignition at the entrance to the furnace, the hot gases pass through the melting chamber 13 where their temperature averages 2450 to 2600 degrees. At the end of their path through the melting chamber the gases move upward in front of the baffle wall 22 and pass over the cap or false top or ceiling 16. As the gases flow over the top 16 their average temperature ranges are from 2250 to 2400 degrees.

The gases then continue to the rear of the furnace cap, or top 16 where they enter an end chamber 23 and pass downward therethrough to the top of the recuperator 25. Where the hot gases make their entrance to the top of the recuperator, that is in the passage 24, above, the tile or tube section indicated by the numeral 25', their average temperature is from 1900 to 2050 degrees.

In their movement over the top of the recuperator, that is in the passage 24, the hot gases are divided, the majority thereof pass downward through the recuperator tubes and the remainder pass into the fire box 26 beneath the boiler 30. The gases which enter the tile tubes of the recuperator are delivered to the heated built-in stack 28 inside the recuperator 25.

This stack 28 which is constructed of fire brick is built inside of the recuperator, so that it will retain the temperature of the tile or tube section 25'. The stack is between a fire-brick wall or partition 29 and the inside or tube portion 25' of the recuperator, and provides a passage for the hot gases from the recuperator 25 to the fire tubes 31 of the boiler 30.

The gases from the stack on entering the boiler 30 have a temperature of from 800 to 1100 degrees. After passing through the fire tubes 31 of the boiler 30, the hot gases enter the boiler stack 33 and are exhausted to the outside atmosphere by the exhaust fans 34.

As mentioned above, the hot gases are divided at the top of the recuperator. At this point of division the temperature of the gases is 1900 to 2050 degrees as mentioned above. The portion of the gases which pass through the fire chamber or fire box 26 are drawn through twelve or more openings or automatic traps 39 which are controlled by a thermostat 40.

These automatic traps 39 are connected to the exhaust stack 34 of the boiler by means of a pipe line 41. Each trap is provided with a door or slide member 42 the degree of opening of which is regulated in accordance with the distance of the door or valve 42 from the exhaust fan 34 so that the draft through the fire box is equalized throughout the extent of the valve openings.

The under boiler or fire-box chamber 26 and the passage 24 on the inside top of the recuperator form together one large compartment which receives heat from the recuperator and functions as an extended fire box.

The draft created by the heated gases and the exhaust fan 34 may also be governed by a plurality of draft or fire slabs 43. These slabs are the only separation between the recuperator 25 and the fire chamber 26 under the boiler with the exception of supports between the slabs. These slabs are raised or lowered by one continuous shaft 44, each slab being connected to geared bars 45 which in turn mesh with gears 46 on the shaft 44. The shaft in turn is provided with a gear 47 which meshes with a pinion 48 on the shaft of the motor 49. The motor is automatically controlled by the thermostat 50. These slabs form a very important part in adjusting the temperature under the boiler and also in regulating the heat to the tubes.

When it becomes necessary to repair the glass furnace 10 or, for any other reason, it is desired to operate the boiler 30 independently, the boiler may be separated from the other units, namely, the recuperator and the glass furnace, by lowering the fire slabs 43 along the length of the boiler, and removing the slabs 51 in the front section of the boiler which were used to separate each compartment between the tubes in the boiler section and the fire chamber under the boiler. These slabs 51 are hand-operated as they may only be used once in emergency during the year to continue the production of steam for use in running the plant.

A damper 52 in the top of the recuperator stack is also closed to prevent the intake of air or the escape of fire into the recuperator.

By removing the slabs 51 and lowering the fire slabs 43 between the tube section and the fire chamber 26 under the boiler, a regular steam boiler is produced which functions independently of the glass furnace and the recuperator. The only difference in the operation of the boiler in the independent steam system is that it is fired from the rear instead of in the front as when the furnace is used. Oil is applied by two fixing nozzles 53 connected with a compressed air line to atomize oil. This oil fire travels from the rear to the front of the boiler, and then up and through the fire tubes 31 as shown in Fig. 4, to the boiler stack 33. When the boiler is fired by oil independent of the glass furnace, it is not necessary to use the exhaust fan as a direct natural draft is created. Under these conditions the exhaust fan may be either shut off entirely, or can be reduced in R. P. M. to a minimum so as not to pull fire too quickly from the boiler. The fire slabs 43 are lowered, the slabs 51 removed, and the traps 39 are closed completely when the boiler is fired by oil.

Having thus described my invention, what I claim as new and wish to secure by Letters Patent is:

1. An apparatus for utilizing waste heat comprising, in combination, an industrial furnace including a combustion chamber provided with a fuel injection means, a boiler, and a recuperator located intermediate said furnace and boiler in controlled communication therewith, means in connection with said recuperator for receiving hot gases from said furnace and directing them into said boiler for heating purposes, the said recuperator including means for utilizing the passage of hot gases therethrough to heat an air supply flowing through the recuperator into said combustion chamber.

2. An apparatus for utilizing waste heat comprising, in combination, an industrial furnace including a combustion chamber provided with a fuel inlet, a boiler, fire tubes in the boiler, a recuperator including a tubular section located intermediate said furnace and said boiler and in communication therewith, means communicating with said tubular section and including a chamber and a stack for receiving hot gases from said furnace and directing portions thereof respectively to the fire box and fire tubes of said boiler for heating purposes, and means in connection with said fire box for proportioning the flow of said gases, said tubular section being adapted to heat an air supply flowing through the recuperator into said combustion chamber.

3. An apparatus for utilizing the waste heat comprising, in combination, an industrial furnace having an intake passageway for heated air and an outlet passageway for heated gases, a recuperator including an interior section of vertically arranged spaced tubes, an inlet for admitting air to circulate around said tubes, an outlet for said circulated air communicating with the air intake of said furnace, and a transverse chamber for heated gases at the uuper end of said tubes and communicating therewith and with the outlet of said furnace, a stack formed within said recuperator and communicating with the lower end of said recuperator tubes, a boiler unit including fire tubes and a fire box communicating with said transverse chamber, said fire tubes communicating with said stack, an exhaust stack connected with said boiler unit, and means connected with said exhaust stack adapted to effect a draft through the boiler unit, the recuperator, and the furnace.

4. An apparatus for utilizing waste heat comprising, in combination, an industrial furnace provided with a combustion chamber having a fuel inlet, an intake passageway for supplying heated air to said combustion chamber, an outlet passageway for heated gases, a recuperator connected to said furnace, said recuperator including an interior section of spaced tubes, an inlet for admitting air to circulate around said tubes, an outlet for said circulated air communicating with the air intake of said furnace, and a transverse by-pass chamber for heated gases above said recuperator and communicating with the tubes of said tubular section and with the outlet of said furnace, a recuperator stack communicating with the other end of said recuperator tubes, a boiler unit connected to said recuperator, said boiler unit including fire tubes and a fire box provided with fuel supply nozzles, said fire box communicating with said transverse chamber, the said fire tubes communicating with said recuperator stack, an exhaust stack, means for effecting a draft through the boiler unit, the recuperator, and the furnace whereby the hot exhaust gases from said furnace are drawn through the fire box and through the recuperator to the fire tubes of said boiler to effect the operation thereof, and means in connection with said furnace including fire slabs and traps adapted to regulate the draft therethrough and to cut off the supply of hot gases from the recuperator to allow the operation of the furnace as a separate unit by means of said fuel supply nozzles.

5. An apparatus for utilizing waste heat comprising in combination, a furnace including a combustion chamber, a separately fired boiler, and a recuperator communicably connected therewith, the connections constituting means for conducting hot gases from said furnace to said boiler and to said combustion chamber, and means for cutting off the communicative connection to the boiler from said furnace for the separate operation of said boiler as a single unit.

6. An apparatus for utilizing waste heat comprising in combination, an industrial furnace including a combustion chamber, a boiler including a fire box and a recuperator communicably interconnecting the same, the connections therebetween constituting means for conducting a portion of the hot gases from said furnace to said boiler, and through said recuperator to preheat the air supply to said combustion chamber, and means in connection with said recuperator including a damper and fire slabs for cutting off communication with said boiler for the separate operation thereof.

WILLIAM E. GREMPLER.